Sept. 2, 1952  J. A. CROWHURST  2,609,057
VARIABLE PITCH AIRSCREW
Filed Feb. 1, 1946  6 Sheets-Sheet 1

Inventor
JAMES A. CROWHURST
by Reynolds & Beach
Attorney

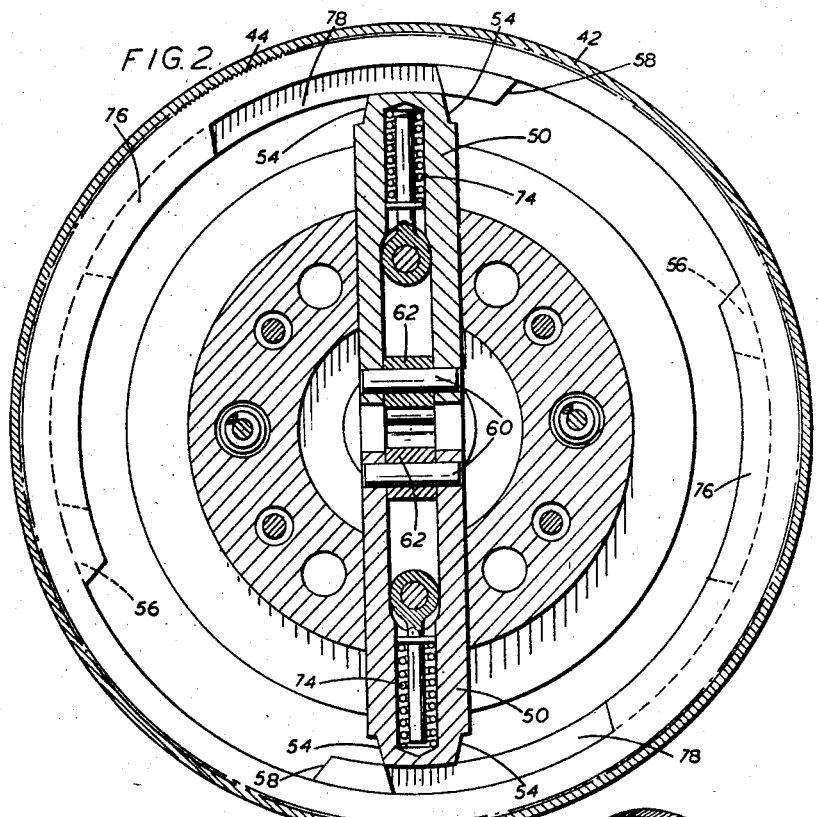
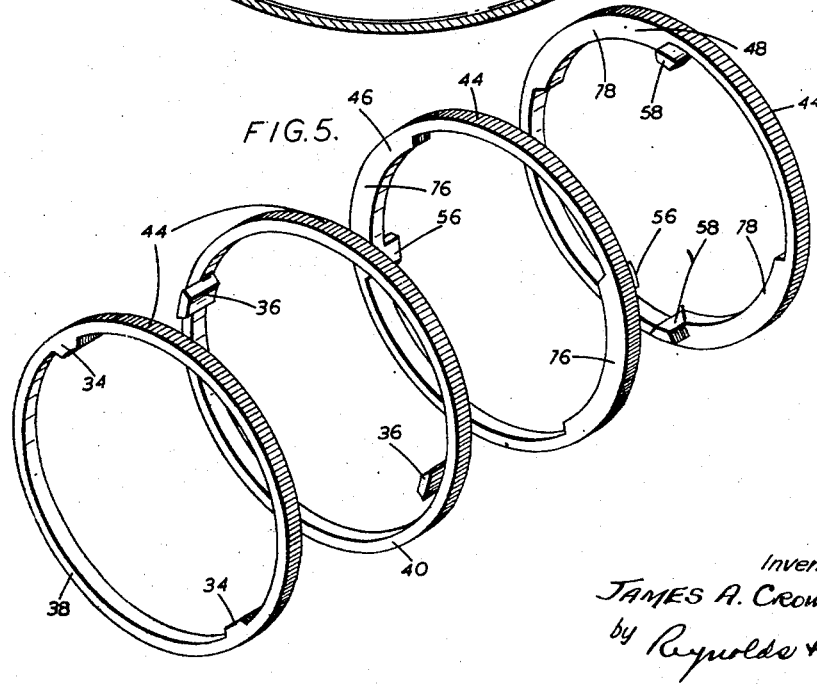

Sept. 2, 1952     J. A. CROWHURST     2,609,057
VARIABLE PITCH AIRSCREW

Filed Feb. 1, 1946     6 Sheets-Sheet 3

Inventor
JAMES A. CROWHURST
by Reynolds & Beach
Attorney

Inventor
JAMES A. CROWHURST
by Reynolds & Beach
Attorney

Sept. 2, 1952  J. A. CROWHURST  2,609,057
VARIABLE PITCH AIRSCREW
Filed Feb. 1, 1946  6 Sheets-Sheet 5

Inventor
JAMES A. CROWHURST
by
Reynolds & Beach
Attorney

Sept. 2, 1952  J. A. CROWHURST  2,609,057
VARIABLE PITCH AIRSCREW
Filed Feb. 1, 1946  6 Sheets-Sheet 6

Inventor
JAMES A. CROWHURST
by
Reynolds & Beach
Attorney

Patented Sept. 2, 1952

2,609,057

UNITED STATES PATENT OFFICE 2,609,057

VARIABLE-PITCH AIRSCREW

James Arthur Crowhurst, Hatfield, England, assignor to The De Havilland Aircraft Company Limited, Hatfield, England Application February 1, 1946, Serial No. 644,746
In Great Britain February 1, 1945

9 Claims. (Cl. 170—160.32)

This invention relates to hydraulically-operated variable-pitch airscrews of the kind provided with governor-controlled constant speed mechanism. It is usual in such airscrews to provide permanent stops which limit the range of pitch change movement in both directions as a safety measure. When it is desired to provide for pitch changes outside this range, for example for feathering or for braking by reversing the pitch of the blades, these permanent stops can no longer be employed. For safety, however, it is still desirable to provide stops which limit the range of pitch change movement that is possible while the constant speed mechanism is operative and has not been over-ridden to enable the blades to be feathered or reversed in pitch.

It is particularly desirable to ensure that undesirable movement of the blades in the direction of fine pitch shall not take place because such movement may lead to dangerous over-speeding.

Hitherto it has been considered impossible to employ mechanical stops releasable at will owing to the high loading to which such stops would be subjected at the moment of release, operating to resist strongly mechanical release, and attempts have been made to limit the range of movement by hydraulic means. In these attempts, however, difficulties have been encountered in preventing leakage of oil and consequent variability of the stop positions.

It has now been found that the prohibitively high loading on mechanical stops during their release can be obviated.

According to the present invention the co-operating surfaces of a releasable mechanical stop device are inclined to the direction of the load at an angle such that the load tends to cam the releasable stop member out of the engaged position and the releasable stop member is normally held positively in the engaged position by a detent device which is disabled or withdrawn when it is desired to release the stop member. Preferably the detent device consists of a toggle which is broken by hydraulic or other means when it is desired to release the stop, whereupon the releasable stop member is cammed out of engagement and further pitch change movement can take place. It will be evident that the toggle can be operated in such a way as to exert a positive releasing action on the stop member, and in such a case the inclination of the co-operating stop surfaces can be such as to provide only a very slight releasing force. In either case the effect is that the load between the inclined surfaces of the two stop members during the releasing movement is negligible, even when the two surfaces are in engagement at their extreme edges only. Thus, the excessive wear that would occur at such times, in the absence of any camming action, is avoided.

Referring to the accompanying drawings:

Figure 2 is an end elevation in section on the line II—II in Figure 1;

Figure 5 is an exploded view in perspective of the four stop-rings;

Figure 1:
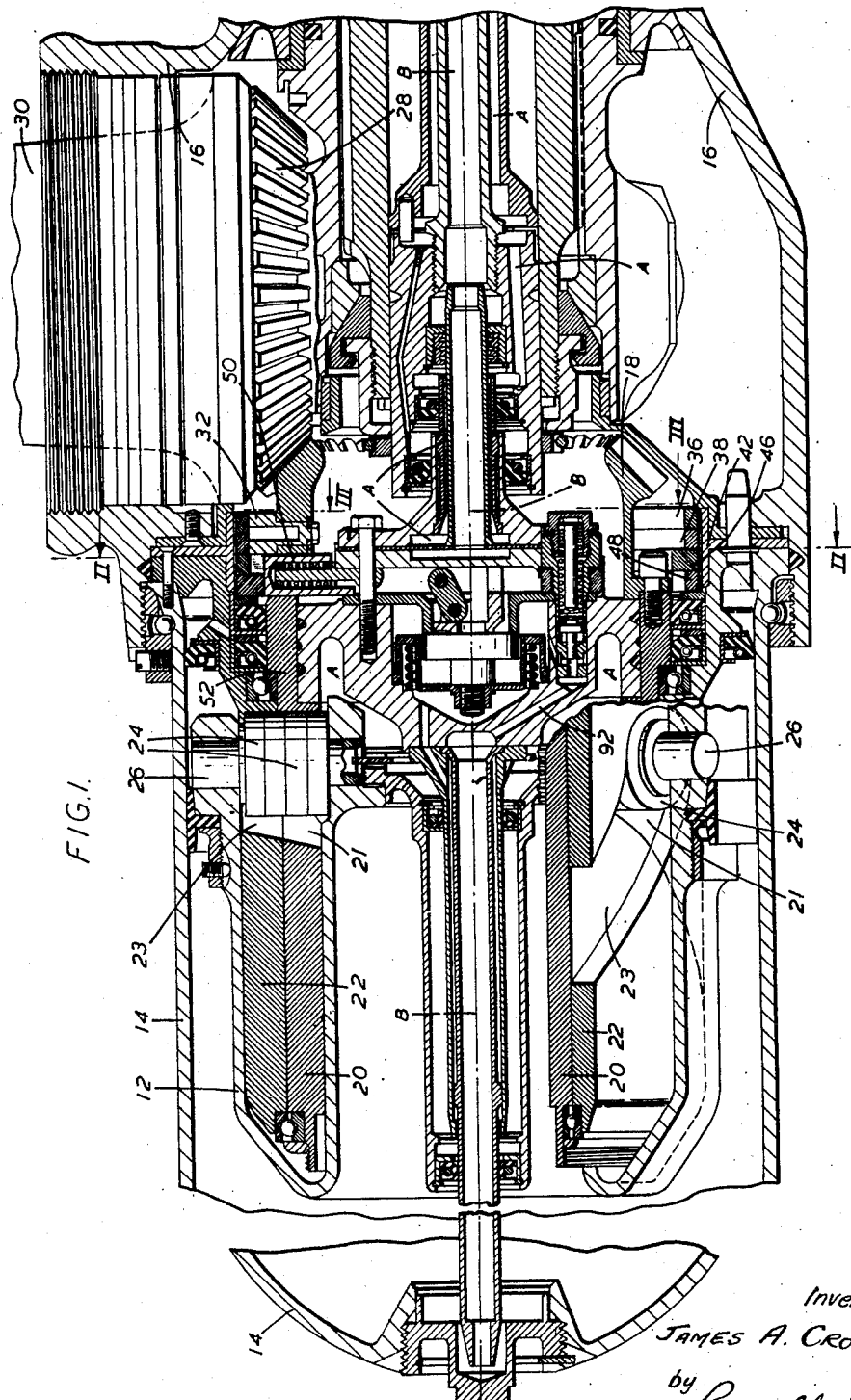
Figure 1 is a combined side elevation and plan of an airscrew hub according to the present invention, the upper half of the figure being in section on the line A in Figure 3 and the lower half in section on the line B in Figure 3.

The embodiment of the invention now to be described with reference to the drawings is applied to an airscrew in which provision is made both for feathering and air-braking, and in which the reciprocating movement of the hydraulic pitch-change piston 12 within the cylinder 14 (forming an axial extension of the hub shell 16) is converted into rotary movement of a bevel gear 18 by means of two sleeves 20, 22, one within the other, formed with inclined slots 21, 23, respectively, co-operating with rollers 24 on radially disposed pins 26 carried by the piston 12, the bevel gear 18 being carried by the inner sleeve 20 and the outer sleeve 22 being fixed to the airscrew hub shell 16. The bevel gear 18 meshes with a number of bevel gears 28, one of which is secured to the root of each of the airscrew blades 30.

Figure 3:
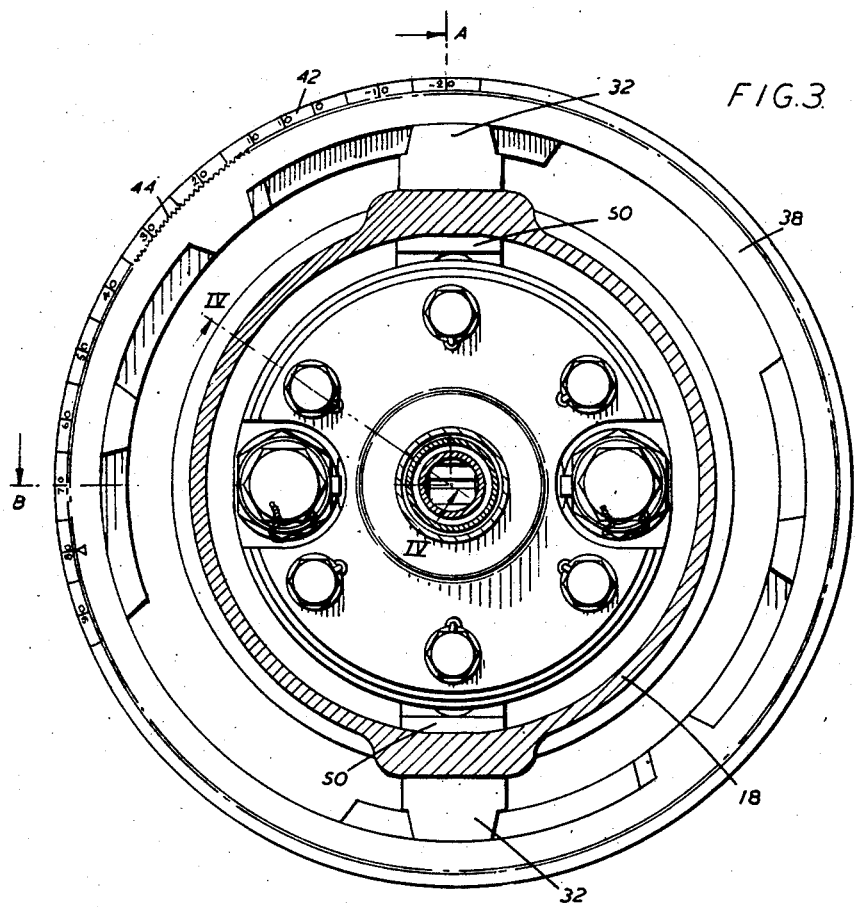
Figure 3 is an end elevation in cross section on the line III—III in Figure 1.
Figure 4:
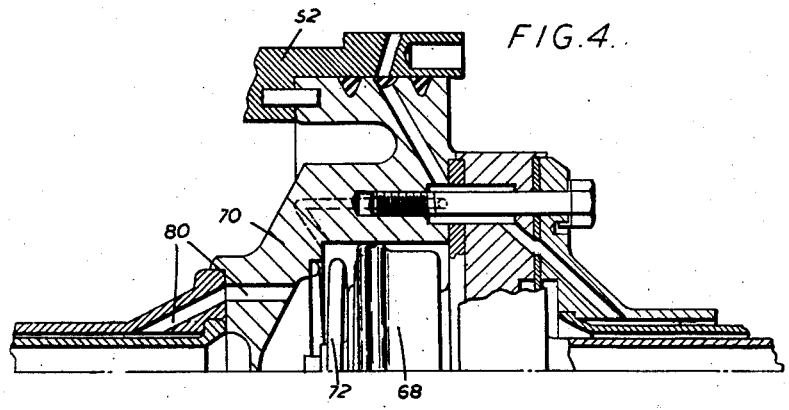
Figure 4 is a view in section on the line IV—IV in Figure 3.
Figure 6:
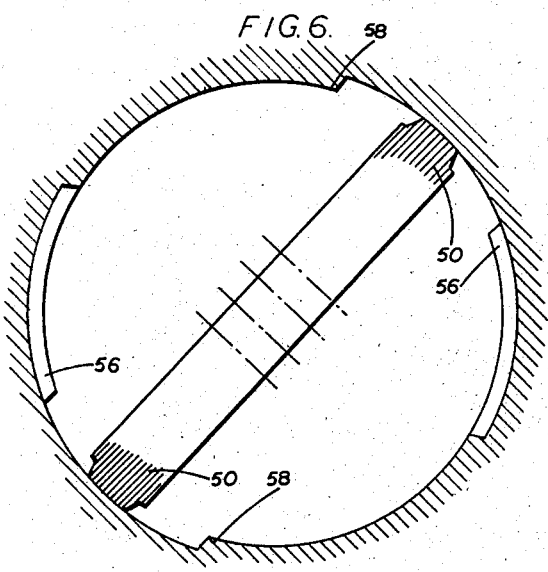
Figures 6 and 7 are diagrams illustrating the manner in which the stop-members incorporate with the stop-rings.

Two projections 32 carried by the bevel gear 18 co-operate with two pairs of inwardly-extending end-stop projections 34, 36 on two rings 38, 40 respectively, externally splined for engagement with an internally splined sleeve 42 fixed to the hub. The splines 44 are closely spaced as indicated in Figure 3 to provide a means of adjusting the angular positions of the two pairs of end-stops 34, 36 independently of one another.

Figure 7:
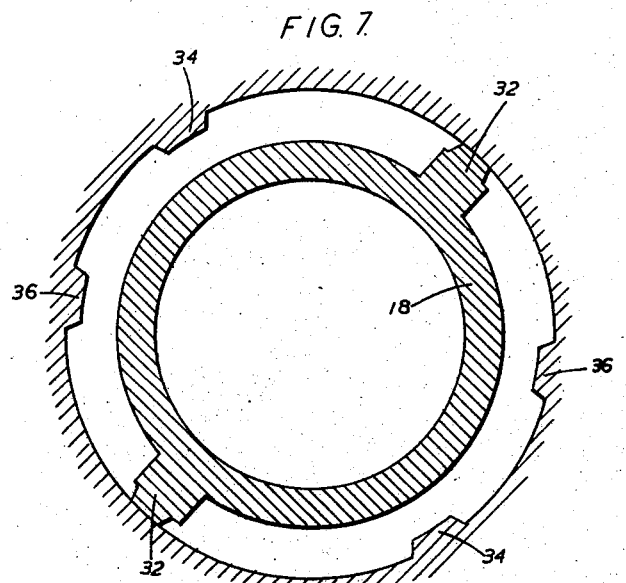

In airscrews as hitherto constructed for constant-speed operation only, the two stop-rings were angularly adjusted to provide a comparatively narrow range of pitch-change, but in the improved airscrew they are adjusted for a very much wider range of pitch-change from the feathered position to the maximum negative or reverse pitch position. As will be seen from Figure 7 this range of angular movement is of the order of 120°.

Two further splined stop-rings 46, 48 are provided which engage in the internally splined sleeve 42, and these additional stop-rings cooperate with two releasable stop-members 50 which slide in radial guides or slots in the hub portion 52 of the bevel gear 18, which hub portion is constituted by an extension of the inner sleeve 20.

The outer ends of the releasable stop-members 50 are bevelled on both sides as seen along the axis of rotation, the two bevelled or inclined surfaces 54 converging outwardly and each being at an angle of 23° to the centre line of the stop-member. The faces of the stop projections 56, 58 on the two additional stop-rings 46, 48 are correspondingly inclined and it is found that this inclination is such that when the stop surfaces 54 are in engagement with the faces of the members 56 or 58 and are under load consequent on the torque exerted on the inner sleeve 20 by the piston 12, there is a light force acting on the members 50 tending to move them inwards.

At their inner ends the two members 50, diametrically in line with one another, are connected by means of pivot pins 60 to the outer ends of two toggle links 62, the inner ends of which are connected by pivot pins 64 to the piston rod 66 of a small stop-release piston 68 sliding in a stop-release cylinder 70 centrally situated and secured to the part 52 carrying the bevel gear 18, the axis of the cylinder 70 being coincident with the axis of rotation of the airscrew.

Figure 8:
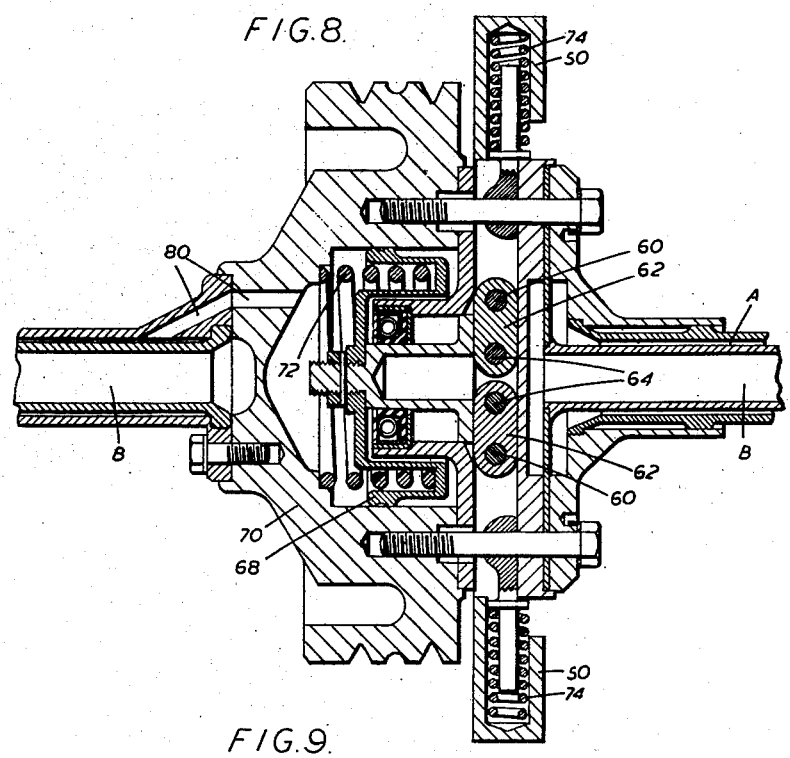
Figure 8 is a side elevation in cross-section of the movable stop-members and the hydraulic actuating means therefor.

When the toggle links 62 are in line, as shown in Figure 8, they hold the stop-members 50 extended into the path of the projections 56, 58 and the piston 68 is urged into this position by means of a coil compression spring 72. When the piston 68 is moved to the left by oil pressure in the right hand end of the cylinder 70, the stop members 50 are moved inwardly into the positions shown in Figures 1 and 2, out of engagement with the projections 56, 58, against the action of coil compression springs 74 housed in bores in the members 50, which co-operate with the spring 72 to return the members 50 to their outward positions when the oil pressure in the right hand end of the cylinder 70 is relieved.

As will be seen from Figure 5, the projections 56 extend across the thickness of the ring 48, while the projections 58 extend across the thickness of the ring 46. The projections 34, 36 are similarly arranged. The projections 56, 58, moreover, are extended circumferentially around the inner edges of the rings, these extended portions being designated 76, 78 respectively. In Figure 2 the stop-members 50 are shown retracted inwards and riding upon the inner edges of the extensions 78. The bevel gear 18 has, therefore, rotated counterclockwise, as seen in this figure, since the stop-members 50 were disengaged from the projections 58, and this counterclockwise motion can continue until the non-retractable stop-members 32 encounter the projections 34, Figure 7. The extensions 76, 78 overlap, as clearly shown in Figure 2, in all positions of adjustment of the rings 46, 48, with the result that the stop-members 50 cannot move outwards and prevent the return or clockwise movement of the bevel gear 18 from a position such as is shown in Figure 2. Similarly, if clockwise rotation has taken place and the ends of the stop-members 50 are riding upon the inner edges of the extensions 76, the overlap of these extensions with the extensions 78 ensure that there is nothing to impede or prevent return in the counter-clockwise direction.

When the blades 30 are under the control of the governor-operated constant-speed unit (not shown), the outboard end of the main cylinder 14 (that is to say the left-hand end as seen in Figure 1) is supplied with engine lubricating oil, at say, 100 lbs. per square inch pressure, while the inboard end of this cylinder is supplied with oil from the constant-speed unit at, say 400 lbs. per square inch, to increase pitch, and connected to drain to decrease pitch.

For movement of the blades in the direction of increasing pitch beyond the constant-speed range (that is to say, for feathering), oil at a pressure greater than 400 lbs. per square inch is supplied to the inboard end of the cylinder 14.

For movement in the direction of decreasing pitch beyond the constant-speed range (that is to say, for braking), oil at a pressure greater than 100 lbs. per square inch or more, is supplied to the outboard end of the cylinder 14. These increases of oil pressure are utilised to retract the releasable stop-members 50 automatically to allow the required movements of the blades to take place.

Figure 9:
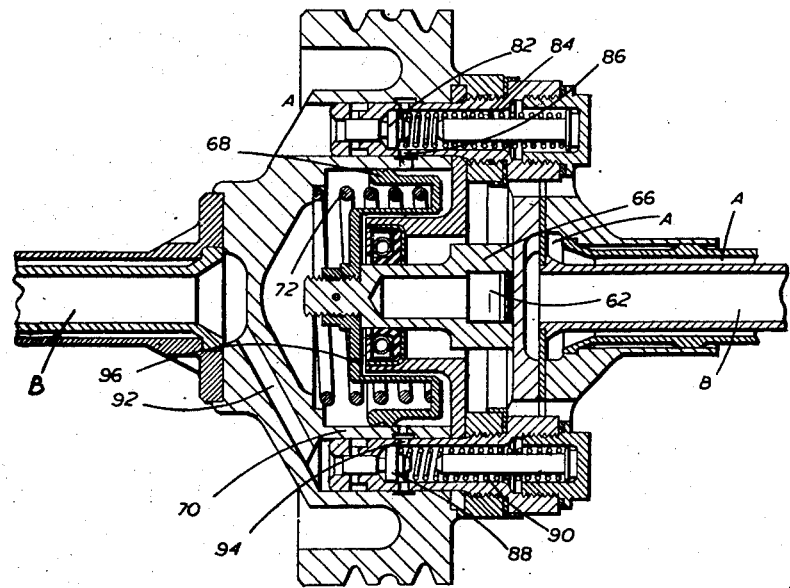
Figure 9 is a plan in section of the parts shown in Figure 8.

The left-hand end of the stop-release cylinder 70 is permanently connected to drain through passages 80. The right-hand end of this cylinder is connected separately to the two oil supply conduits. The oil supply conduit for the inboard end of the main cylinder is made up of a number of passages, all of which are designated "A." The oil supply conduit for the outboard or left-hand end of the main cylinder is made up of a number of passages, all of which are designated "B". Both the aforesaid connections are normally shut off by means of spring-closed valves, one for each connection, which are exposed to the pressure in the respective conduits. Both these valves are shown in Figure 9. The valve 82, urged by a spring 84 towards the left, is exposed on its left-hand side to the pressure in the passages A. When this pressure is increased beyond 100 lbs. per square inch, the valve 82 moves to the right, thereby uncovering ports 86 which admit oil under pressure to the right-hand end of the cylinder 70, thereby withdrawing or retracting the stop-members 50, as previously described, and permitting the bevel gear 18 to rotate beyond the constant-speed range towards the braking position.

The other valve 88, urged to the closed position by a spring 90, is exposed at its left-hand end to the pressure in the passages B through a passage 92. In the same way, if the pressure in the passages B increases beyond 400 lbs. per square inch, the valve 88 opens ports 94 to admit oil under pressure to the right-hand end of the cylinder 70, with the result that the blades can turn beyond the constant-speed range towards the feathered position.

The valves 82, 88 do not open, except under the influence of oil pressure, and consequently the oil in the cylinder 70 cannot escape past these valves in any circumstances. In order to enable the spring 72 to return the piston 68 to its original position, shown in Figures 8 and 9, to extend the stop-members 50 once more into engagement with the projections of the stop-rings, a bleed-hole 96 is formed in the piston 68 through which the oil in the right-hand end of the cylinder can escape slowly to drain.

Figure 10:
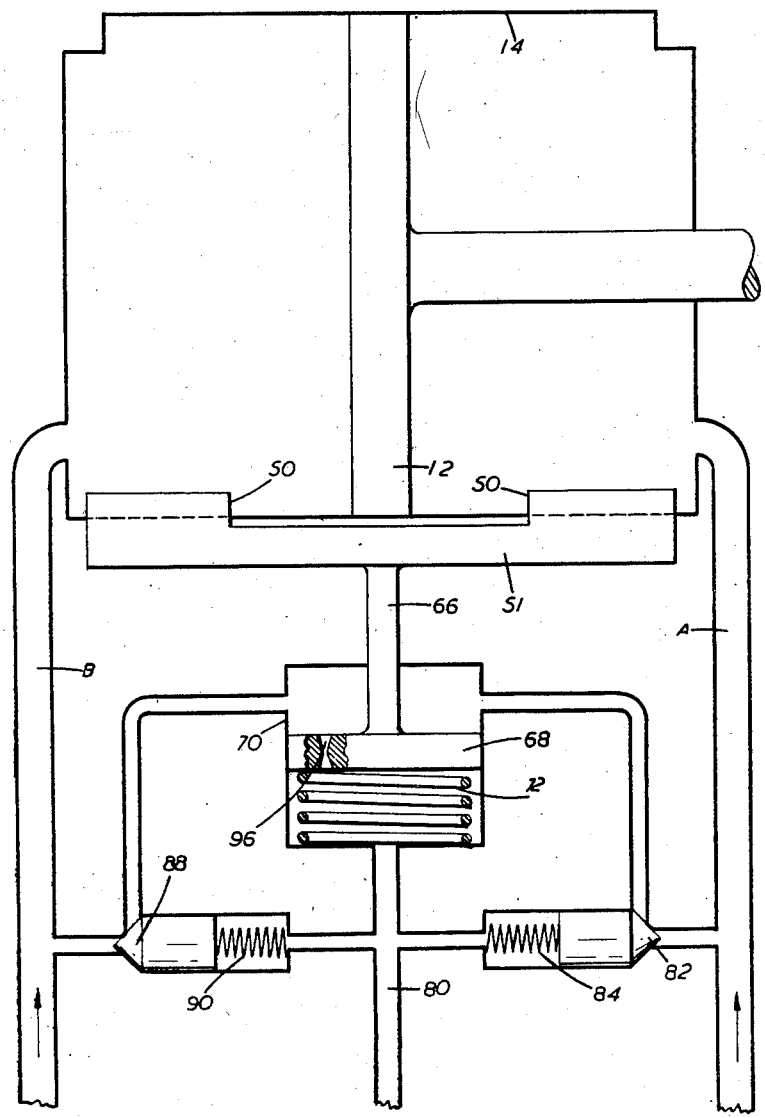
Figure 10 is an explanatory diagram.

The mode of operation of the mechanism described above will be more easily followed from an inspection of the diagram, Figure 10. In this diagram the parts have, so far as possible, the same reference characters as the parts of the mechanism already described, which correspond to them. Instead, however, of the releasable stops 50 being carried by a rotatable part and co-operating with fixed projections, they are shown in Figure 10 as shoulders on a single member 51 co-operating with the piston 12 itself. Although Figure 10 is intended to be merely an explanatory diagram, it is evident that in practice the releasable stops could be arranged to co-operate with the piston 12, or with any other moving part of the mechanism which is positively geared or connected to the airscrew blades.

Again referring to Figure 10, the member 51 is shown in such a position that the shoulders 50 will confine the movement of the piston 12 to a narrow range corresponding to constant-speed operation. This member 51 is directly connected to the piston rod 66 secured to the piston 68, the coil spring 72 maintaining the parts in the position shown. It will be seen that no oil can enter the upper end of the cylinder 70 so long as the two valves 82, 88 are closed and the springs 84, 90 are capable of holding these valves closed against the relatively lower pressures in the conduits A and B respectively, which occur during constant-speed operation. If the pressure in either of these conduits rises, as it would to effect movement into braking or feathering range, to a point sufficient to overcome the force of either of the springs 84 or 90, the valve 82 or the valve 88 opens, as the case may be, oil under pressure is admitted to the cylinder 70, the piston 68 moves downwards and the shoulders 50 are withdrawn from the path of the piston 12, which can now move either in the outboard or the inboard direction according to whether the increased pressure is in the conduit A or in the conduit B. Thereafter, notwithstanding bleeding past the port 96 which would permit spring 72 to return piston 68 to its original position, and springs 74 to return stops 50 to their original positions, the stops 50 are held retracted by the projections 76, 78 whereon they ride, so long as operation continues in the abnormal range, for braking or for feathering. As soon as operation in the abnormal range ceases, and stops 50 pass into the normal range between projections 56, 58, these stops 50 snap outwardly under spring influence, and toggle links 62 lock them thus.

What I claim is:

1. In a variable pitch airscrew, pitch-changing mechanism carried by the airscrew hub and operatively connected to the airscrew blades, such pitch-changing mechanism including a member movable with the blades during pitch changes, and first stop means carried by and movable with said member, second stop means carried by and fixed relative to the airscrew hub and located in position to engage with the first stop means and thereby to define, by their interengagement, opposite limits of normal pitch change of the airscrew blades, one of said stop means being retractable relative to the other to enable exceeding at least one of said limits of pitch change, said first and second stop means having contacting surfaces so inclined in relation to the direction of the force which urges them into engagement, that, by mutual cam action, they tend to effect retraction of such retractable stop means retractively to such force, means normally holding said retractable stop means to resist such cammed retraction thereof, and stop-release means operable to withdraw said holding means to enable retraction of the retractable stop means automatically in reaction to such force, thereby to enable exceeding at least the one such limit of pitch change.

2. The variable pitch airscrew defined in claim 1, and further including hydraulic control means operative in response to supply of pressure-fluid thereto at a predetermined normal pressure to move the airscrew blades in the range between the limits defined by the cooperating stop means, and also beyond at least the one such limit upon retraction of the retractable stop means, and pressure-fluid supply means connected to supply pressure-fluid to said hydraulic control means at said normal pressure and further operable, at least momentarily, to increase the pressure of such fluid above such normal pressure, and further wherein the stop-release means comprises hydraulically-actuated means connected to said supply means, and control means for said hydraulically-actuated means, which are unresponsive to normal fluid pressure thereof, but responsive automatically to increases in such pressure thereof above such normal pressure, to effect withdrawal of the detent means thereby.

3. In a variable pitch airscrew, in combination with a hub and airscrew blades journaled therein, and hydraulically operable means carried by the hub and operatively connected to the blades to effect controlled pitch change of the blades throughout a total range in excess of the normal operating range; a stop member fixed with relation to the hub, a cooperating stop member mounted within the hub for releasing movement, and operatively connected for movement with the blades during pitch change, in a locus for engagement with said fixed stop member to limit normal pitch change movement to a normal operating range less than the total range possible under the influence of said hydraulically operable pitch-changing means, the interengaging surfaces of the cooperating fixed and releasable stop members being inclined to the direction of the hydraulic load acting upon them, as cams tending to effect release of the so-engaging surfaces under such hydraulic load, holding means normally maintaining the releasable stop member in its engaged position, and means operable at will to disable said holding means, for cammed release of the releasable stop member from the fixed stop member, and consequent hydraulically effected pitch-change movement beyond the normal operating limit.

4. The combination of claim 3, including hydraulic means to operate the disabling means, and means to supply thereto hydraulic fluid from the same source, within the hub, as effects the pitch-change consequent upon disengagement of the releasable stop member.

5. The combination of claim 4, including mechanical means to maintain the releasable stop member in disengaged position throughout its movement beyond the limit of the normal operating range, spring means operatively connected to the releasable stop member and active to return the same to normal engaging position upon its return within the normal operating range, and means to relieve pressure within the hydraulic operating means for the disabling means immediately following its actuation and shift of the blades beyond the normal operating limit.

6. In a variable pitch airscrew, in combination with a hub and airscrew blades journaled therein, and hydraulically operable means carried by the hub and operatively connected to the blades to effect controlled pitch change of the blades throughout a total range in excess of the normal operating range; a stop member fixed to the hub at a definite position angularly about the hub's axis, a cooperating releasable stop member mounted within but for rotative movement relative to the hub in a locus to engage the fixed stop member, and for shifting radially of the hub into and from engagement with said fixed stop member, said releasable stop member being operatively connected for rotative movement with the blades in consonance with change of pitch, and when in position to engage said fixed stop member limiting pitch change movement to a normal operating range which is less than the total possible range, the interengaging surfaces of the cooperating fixed and releasable stop members being inclined relative to the direction of the hydraulic load acting upon them, as cams tending to effect release of the so-engaging surfaces under such hydraulic load, a hydraulic cylinder and piston carried by the hub, holding means interconnecting said piston and the releasable stop member, and in a normal position maintaining the latter in its engaging position, spring means urging the piston and holding means into and normally retaining them in such engaging position, and means to supply hydraulic fluid under pressure from a source within the hub to said cylinder, to shift said piston from its normal position and to disable said holding means, for cammed release of the releasable stop member from the fixed stop member, and consequent hydraulically effected pitch-change movement beyond the normal range.

7. The combination of claim 6, wherein the hydraulic means to accomplish pitch change constitutes the source of pressure fluid for actuation of the piston and for consequent disabling actuation of the holding means, coincident with actuation of the hydraulic pitch change means.

8. The combination of claim 7, wherein the piston has a bleed port for release of pressure in the cylinder following actuation of the piston, and including means positioned for engagement with the releasable stop means, so long as the latter is located beyond the normal operating range, to hold the same in released position, and spring means operatively connected to the releasable stop means to restore the latter to engaging position upon its return to normal operating range.

9. The combination of claim 6, wherein the means to supply hydraulic fluid to the cylinder includes a conduit connecting within the hub to the pressure fluid source for pitch change, a valve in said conduit spring-held closed against pressures employed in normal pitch change range, but operable by higher pressures employed in pitch change beyond such normal range.

JAMES ARTHUR CROWHURST.

REFERENCES CITED

The following references are of record in the file of this patent:

UNITED STATES PATENTS

| Number | Name | Date |
|---|---|---|
| 1,509,944 | Forgette et al. | Sept. 30, 1924 |
| 1,851,874 | Seppeler | Mar. 29, 1932 |
| 2,174,717 | Caldwell et al. | Oct. 3, 1939 |
| 2,282,297 | Keller | May 5, 1942 |
| 2,320,195 | Rindfleisch | May 25, 1943 |
| 2,343,416 | Keller | Mar. 7, 1944 |
| 2,368,950 | Thomas | Feb. 6, 1945 |
| 2,379,302 | Hoover | June 26, 1945 |
| 2,392,364 | Caldwell et al. | Jan. 8, 1946 |
| 2,396,630 | Anderson | Mar. 19, 1946 |
| 2,403,532 | Hoover | July 9, 1946 |
| 2,433,990 | Hardy | Jan. 6, 1948 |

FOREIGN PATENTS

| Number | Country | Date |
|---|---|---|
| 496,022 | Great Britain | Nov. 23, 1938 |
| 497,999 | Great Britain | Jan. 2, 1939 |
| 506,498 | Great Britain | May 30, 1939 |
| 27,972 | Denmark | July 11, 1921 |